(12) United States Patent
Lin

(10) Patent No.: US 7,722,193 B2
(45) Date of Patent: May 25, 2010

(54) LIGHT SOURCE APPARATUS FOR OPTICAL PROJECTING SYSTEM

(75) Inventor: Ying-Fang Lin, Taoyuan (TW)

(73) Assignee: Qisda Corporation, Taoyuan County (TW)

( * ) Notice: Subject to any disclaimer, the term of this patent is extended or adjusted under 35 U.S.C. 154(b) by 749 days.

(21) Appl. No.: 11/561,623

(22) Filed: Nov. 20, 2006

(65) Prior Publication Data

US 2007/0115667 A1 May 24, 2007

(30) Foreign Application Priority Data

Nov. 23, 2005 (TW) .............................. 94141054 A

(51) Int. Cl.
*G03B 21/26* (2006.01)
(52) U.S. Cl. .......................................... 353/94; 353/81
(58) Field of Classification Search .................. 353/37, 353/50, 51, 73, 77, 78, 94, 98, 99; 362/327, 362/341, 346
See application file for complete search history.

(56) References Cited

U.S. PATENT DOCUMENTS

| | | | | |
|---|---|---|---|---|
| 5,300,966 A * | 4/1994 | Uehira et al. | .................. | 353/30 |
| 5,743,612 A * | 4/1998 | Matsuda et al. | ............... | 353/97 |
| 5,765,934 A * | 6/1998 | Okamori et al. | ............... | 353/94 |
| 5,833,341 A * | 11/1998 | Kimura et al. | ................. | 353/98 |
| 6,222,674 B1 * | 4/2001 | Ohta | .......................... | 359/618 |
| 6,224,217 B1 * | 5/2001 | Tanaka | ........................ | 353/94 |
| 6,431,727 B1 * | 8/2002 | Sugawara et al. | ............ | 362/244 |
| 6,488,379 B2 * | 12/2002 | Kane | ........................... | 353/94 |
| 6,505,939 B1 * | 1/2003 | Bierhuizen et al. | ............ | 353/94 |
| 6,570,168 B1 * | 5/2003 | Schultz et al. | ........... | 250/492.2 |
| 6,585,380 B2 * | 7/2003 | Yamamoto | ................... | 353/98 |
| 6,742,898 B2 * | 6/2004 | Shouji | .......................... | 353/31 |
| 6,814,450 B2 * | 11/2004 | Kim | ............................. | 353/94 |
| 7,071,476 B2 * | 7/2006 | Rothweiler et al. | ....... | 250/492.2 |
| 7,090,357 B2 * | 8/2006 | Magarill et al. | ................ | 353/94 |
| 7,182,468 B1 * | 2/2007 | Haven | .......................... | 353/94 |
| 7,222,975 B2 * | 5/2007 | Lin | ............................... | 353/94 |
| 2002/0030795 A1 * | 3/2002 | Yamamoto | ................... | 353/94 |
| 2002/0033933 A1 * | 3/2002 | Yamamoto | ................... | 353/94 |
| 2002/0071103 A1 * | 6/2002 | Satou | ........................... | 353/94 |
| 2002/0149750 A1 * | 10/2002 | Kane | ........................... | 353/94 |
| 2003/0227598 A1 | 12/2003 | Shouji | | |
| 2004/0252285 A1 * | 12/2004 | Lang et al. | .................... | 353/94 |
| 2006/0146296 A1 * | 7/2006 | Lin | ............................... | 353/94 |

FOREIGN PATENT DOCUMENTS

| | | |
|---|---|---|
| JP | 11096803 | 9/1999 |
| JP | 2004 62137 A | 2/2004 |

OTHER PUBLICATIONS

JP2006100061015, Office Action Communication, Jul. 25, 2008, 5 pages.

* cited by examiner

*Primary Examiner*—Georgia Y Epps
*Assistant Examiner*—Bao-Luan Le

(57) ABSTRACT

A light source apparatus for an optical projecting system is disclosed. A light source is disposed on a first optical axis. A second optical axis is perpendicular to the first optical axis. A plurality of light-guiding devices are respectively disposed on the first optical axis, the second optical axis, the first light source or the second light source, for guiding the light emitted by the light sources to the identical direction parallel to the second optical axis.

14 Claims, 5 Drawing Sheets

LIGHT SOURCE APPARATUS FOR OPTICAL PROJECTING SYSTEM

BACKGROUND OF THE INVENTION

1. Field of the Invention

This present invention relates to a light source apparatus, and more particularly, to a light source apparatus for an optical projecting system. A light source is disposed on a first optical axis. A second optical axis is perpendicular to the first optical axis. A plurality of light-guiding devices are respectively disposed on the first optical axis, the second optical axis, the first light source or the second light source, for guiding the light emitted by the light sources to be parallel to the second optical axis.

2. Description of the Prior Art

Referring to FIG. 1, FIG. 1 is a schematic diagram illustrating a light source apparatus for an optical projecting system of the prior art. The light source apparatus 1 as shown in FIG. 1 includes a right light source 11 and a left light source 12. The right light source 11 is disposed on an upper light axis 14. The left light source 12 is disposed on a lower light axis 15. The upper light axis 14 is parallel to the lower light axis 15. A light source reflection module 13 is disposed between the right light source 11 and the left light source 12.

Referring to FIG. 2, FIG. 2 is a schematic diagram illustrating the light source reflection module of the light source apparatus of the prior art. The same description as in FIG. 1 will not be described again. The light source reflection module 13 has an upper light source reflection mirror 131 and a lower light source reflection mirror 132, for reflecting light emitted from the light source. The upper light source reflection mirror 131 is set over the lower light source reflection mirror 132. The upper light source reflection mirror 131 and the lower light source reflection mirror 132 are flat reflection mirrors.

The two light sources of the light source apparatus for an optical projecting system of the prior art are set on two light axes parallel to each other. Therefore, the size of the light source apparatus of the prior art must be big enough to contain the light sources on different light axes. However, the light source apparatus of the prior art is too large, and it is inconvenient to use.

As a result, it is necessary to provide a light source apparatus which can accommodate the two light sources but have a smaller size than the prior art. For this reason, the inventor shows his creativity and develops his invention to the best. Therefore, the invention is created.

SUMMARY OF THE INVENTION

A scope of the present invention is to provide a light source apparatus that can accommodate the two light sources but have a smaller size than the prior art. The light source apparatus has a first light axis. A first light source and a second light source are disposed on the first light axis, and the second light source is opposite to the first light source.

Hence, according to the light source apparatus of the present invention, the first light source and a second light source are disposed on the same light axis. It reduces the size of the light source apparatus effectively and promotes the convenience to use.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
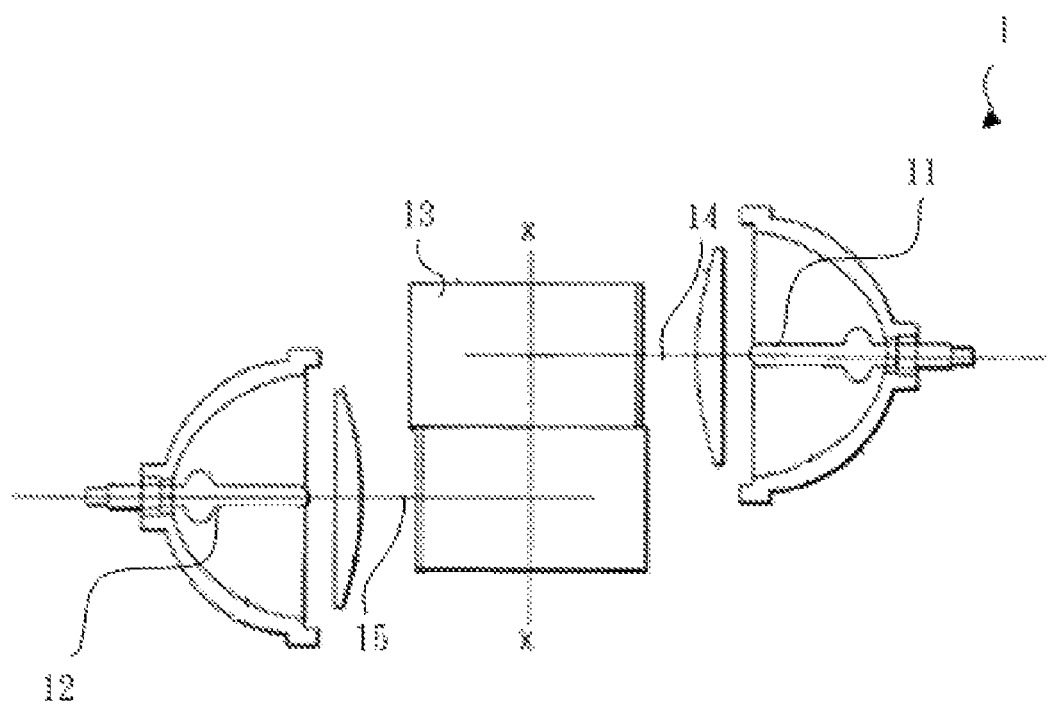
FIG. 1 is a schematic diagram illustrating a light source apparatus for an optical projecting system of the prior art.
Figure 2:
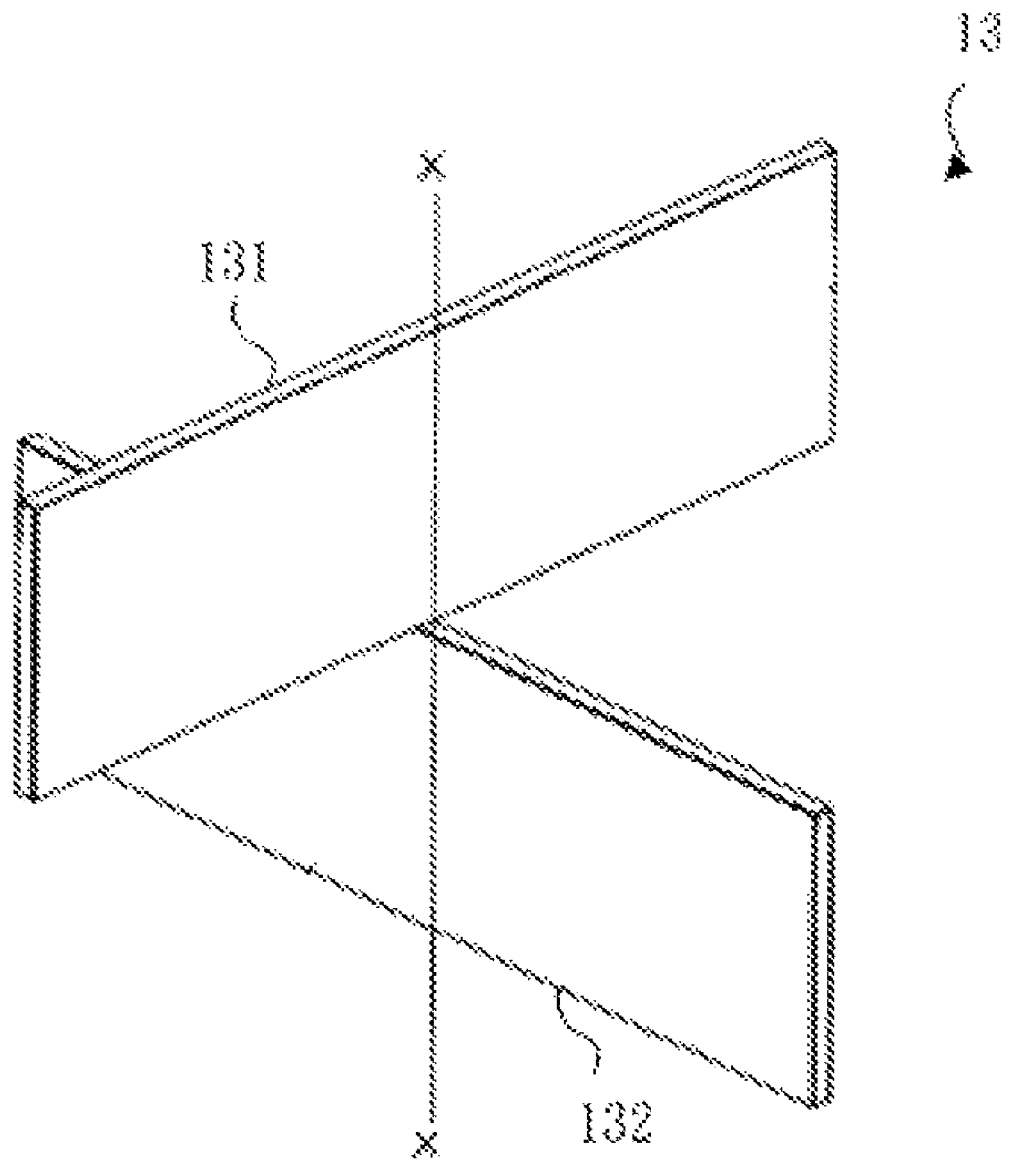
FIG. 2 is a schematic diagram illustrating the light reflection module of the light source apparatus of the prior art.
Figure 3:
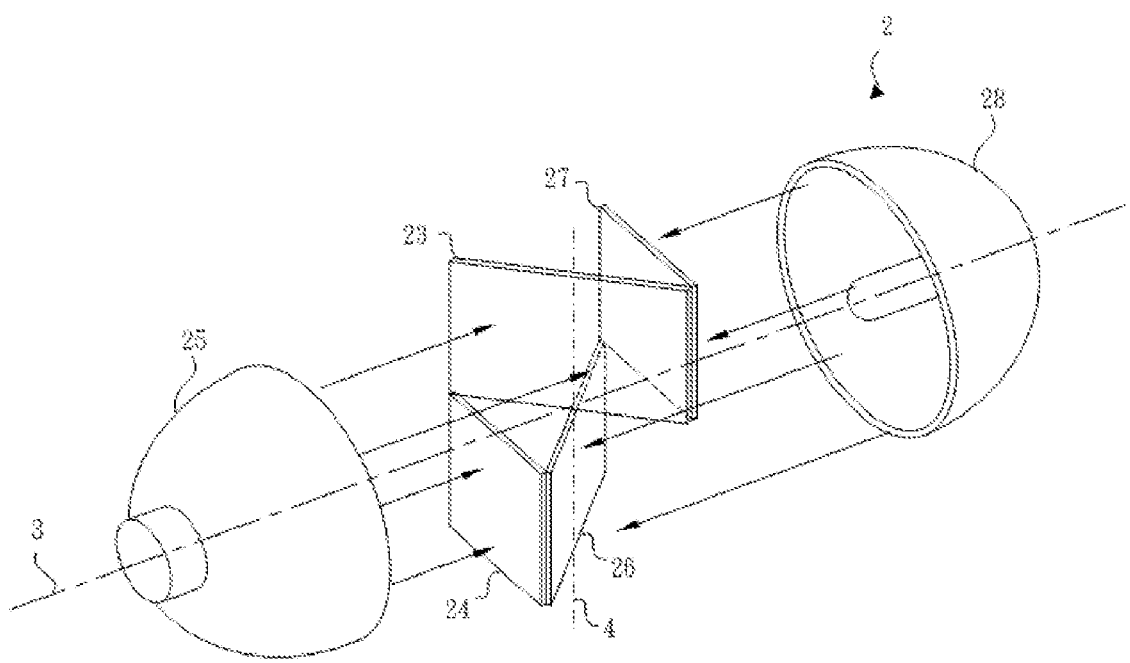
FIG. 3 is a schematic diagram illustrating a light source apparatus according to a preferred embodiment of the invention.

Refer to FIG. 3, FIG. 3 is a schematic diagram illustrating a light source apparatus 2 according to a preferred embodiment of the invention. The light source apparatus 2 has a first optical axis 3 and a second optical axis 4, perpendicular to the first optical axis 3. The light source apparatus 2 includes a first light source 21, a third light-guiding device 25, a first light-guiding device 23, and a second light-guiding device 24. The third light-guiding device 25 is disposed on the first optical axis 3 and near the first light source 21. The first light-guiding device 23 is disposed at an intersection point of the first optical axis 3 and the second optical axis 4. The second light-guiding device 24 is disposed on the first optical axis 3.

The light source apparatus 2 further includes a second light source 22, a sixth light-guiding device 28, a fourth light-guiding device 27, and a fifth light-guiding device 26. The sixth light-guiding device 28 is disposed on the first optical axis 3 and near the second light source 22. The fourth light-guiding device 27 is disposed at an intersection point of the first optical axis 3 and the second optical axis 4. The fifth light-guiding device 26 is disposed on the first optical axis 3.

Figure 4:
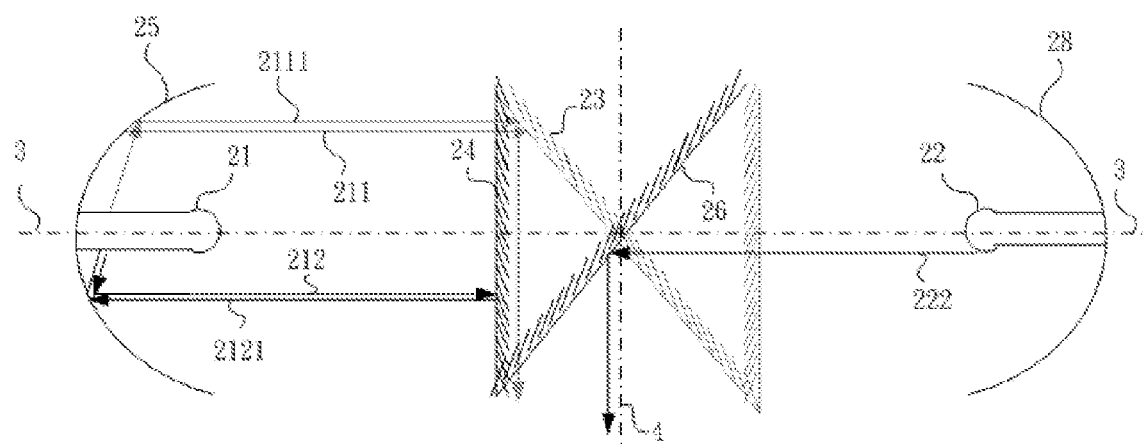
FIG. 4 is a schematic diagram illustrating the top view of the light source apparatus according to a preferred embodiment of the invention.

Referring to FIG. 4, FIG. 4 is a schematic diagram illustrating the top view of the light source apparatus 2 according to a preferred embodiment of the invention. The same description as in FIG. 3 will not be described again. The first light source 21 emits a first lower light 212 parallel to the first optical axis 3. The second light-guiding device 24 guides the first lower light 212 to be a first reflected lower light 2121 opposite to the direction of the first lower light 212. The third light-guiding device 25 guides the first reflected lower light 2121 to be a first reflected upper light 2111 substantially overlapping the first upper light 211; the first upper light is emitted by the first light source 21. The first light-guiding device 23 guides the first upper light 211 and the first reflected upper light 2111 to further travel in a direction parallel to the second optical axis 4.

The second light source 22 emits a second lower light 222 parallel to the first optical axis 3. The fifth light-guiding device 26 guides the second lower light 222 to travel in a direction parallel to the second optical axis 4.

Figure 5:
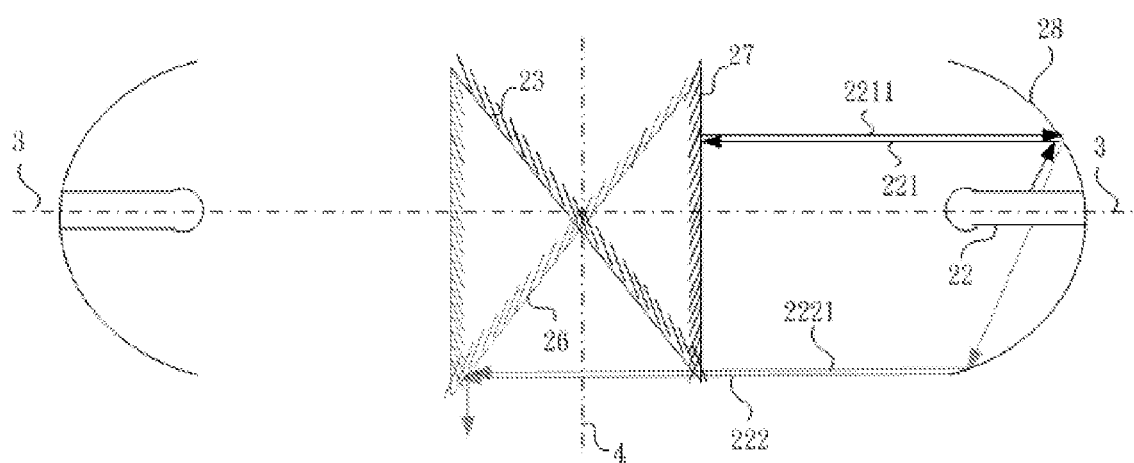
FIG. 5 is a schematic diagram illustrating the bottom view of the light source apparatus according to a preferred embodiment of the invention.

Referring to FIG. 5, FIG. 5 is a schematic diagram illustrating the bottom view of the light source apparatus 2 according to a preferred embodiment of the invention. The second light source 22 emits a second upper light 221 parallel to the first optical axis 3. The fourth light-guiding 27 device guides the second upper light 221 to be a second reflected upper light 2211 opposite to the direction of the second upper light 221. The sixth light-guiding device 28 guides the second reflected upper light 2211 to be a second reflected lower light 2221 substantially overlapping the second lower light 222. The fifth light-guiding device 26 guides the second lower light 222 and the second reflected lower light 2221 to further travel in a direction parallel to the second optical axis 4.

In an embodiment, the first light-guiding device 23 and the second light-guiding device 24 are constructed by flat reflection mirrors.

In an embodiment, the fourth light-guiding device 26 and the fifth light-guiding device 27 are constructed by flat reflection mirrors.

In another embodiment, the third light-guiding device 25 is constructed by a parabolic reflection mirror for reflecting light emitted from the respective light source, such that the reflected lights are parallel to the first optical axis 3.

In another embodiment, the sixth light-guiding device 28 is constructed by a parabolic reflection mirror for reflecting light emitted from the respective light source, such that the reflected lights are parallel to the first optical axis 3.

The light source apparatus as shown in FIG. 3 through FIG. 5 is used for an optical projecting system. In an applied embodiment, the optical projecting system is a projector.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A light source apparatus for an optical projecting system, the light source apparatus having a first optical axis and a second optical axis perpendicular to the first optical axis, the light source apparatus comprising:
   a first light source, disposed on the first optical axis, for emitting a first upper light and a first lower light parallel to the first optical axis;
   a second light-guiding device, disposed below the first optical axis, for guiding the first lower light to be a first reflected lower light opposite to the direction of the first lower light;
   a third light-guiding device, disposed on the first optical axis and near the first light source, for guiding the first reflected lower light to be a first reflected upper light substantially overlapping the first upper light;
   a first light-guiding device, disposed at an intersection point of the first optical axis and the second optical axis opposite to the second light-guiding device and above the first optical axis, for guiding the first upper light and the first reflected upper light further traveling in a direction parallel to the second optical axis;
   a second light source, disposed on the first optical axis and opposite to the first light source, for emitting a second upper light and a second lower light parallel to the first optical axis;
   a fifth light-guiding device, disposed above the first optical axis, for guiding the second upper light to be a second reflected upper light opposite to the direction of the second upper light;
   a sixth light-guiding device, disposed on the first optical axis and near the second light source, for guiding the second reflected upper light to be a second reflected lower light substantially overlapping the second lower light; and
   a fourth light-guiding device, disposed at the intersection point of the first optical axis and the second optical axis opposite to the fifth light-guiding device and below the first optical axis, for guiding the second lower light and the second reflected lower light further traveling in a direction parallel to the second optical axis, wherein the first light-guiding device and the fourth light-guiding device are crosswise disposed through middle portions thereof.

2. The light source apparatus of claim 1, wherein the second light-guiding device is disposed adjacent to an end of the first light-guiding, and the fifth light-guiding device is disposed adjacent to an end of the fourth light-guiding.

3. The light source apparatus of claim 1, wherein the first light-guiding device and the second light-guiding device are constructed by flat reflection mirrors.

4. The light source apparatus of claim 1, wherein the fourth light-guiding device and the fifth light-guiding device are constructed by flat reflection mirrors.

5. The light source apparatus of claim 1, wherein the third light-guiding device is constructed by a parabolic reflection mirror for reflecting light emitted from the respective light source, such that the reflected lights are parallel to the first optical axis.

6. The light source apparatus of claim 1, wherein the sixth light-guiding device is constructed by a parabolic reflection mirror for reflecting light emitted from the respective light source, such that the reflected lights are parallel to the first optical axis.

7. The light source apparatus of claim 1, wherein the optical projecting system is a projector.

8. An optical projecting system, the optical projecting system having a first optical axis and a second optical axis perpendicular to the first optical axis, the optical projecting system comprising:
   a first light source disposed on the first optical axis;
   a second light-guiding device disposed below the first optical axis;
   a third light-guiding device disposed on the first optical axis and near the first light source;
   a first light-guiding device disposed at an intersection point of the first optical axis and the second optical axis opposite to the second light-guiding device and above the first optical axis;
   a second light source disposed on the first optical axis and opposite to the first light source;
   a fifth light-guiding device disposed above the first optical axis;
   a sixth light-guiding device disposed on the first optical axis and near the second light source; and
   a fourth light-guiding device disposed at the intersection point of the first optical axis and the second optical axis opposite to the fifth light-guiding device and below the first optical axis, the first light-guiding device and the fourth light-guiding device being crosswise disposed through middle portions thereof;
   wherein the first light source emits a first upper light and a first lower light parallel to the first optical axis; the second light-guiding device guides the first lower light to be a first reflected lower light opposite to the direction of the first lower light; the third light-guiding device guides the first reflected lower light to be a first reflected upper light substantially overlapping the first upper light; the first light-guiding device guides the first upper light and the first reflected upper light further traveling in a direction parallel to the second optical axis; the second light source emits a second upper light and a second lower light parallel to the first optical axis; the fifth light-guiding device guides the second upper light to be a second reflected upper light opposite to the direction of the second upper light the sixth light-guiding device guides the second reflected upper light to be a second reflected lower light substantially overlapping the second lower light; the fourth light-guiding device guides the second lower light and the second reflected lower light further traveling in a direction parallel to the second optical axis.

9. The optical projecting system of claim 8, wherein the second light-guiding device is disposed adjacent to an end of the first light-guiding, and the fifth light-guiding device is disposed adjacent to an end of the fourth light-guiding.

10. The optical projecting system of claim 8, wherein the first light-guiding device and the second light-guiding device are constructed by flat reflection mirrors.

11. The optical projecting system of claim 8, wherein the fourth light-guiding device and the fifth light-guiding device are constructed by flat reflection mirrors.

12. The optical projecting system of claim 8, wherein the third light-guiding device is constructed by a parabolic reflection mirror for reflecting light emitted from the respective light source, such that the reflected lights are parallel to the first optical axis.

13. The optical projecting system of claim 8, wherein the sixth light-guiding device is constructed by a parabolic reflection mirror for reflecting light emitted from the respective light source, such that the reflected lights are parallel to the first optical axis.

14. The optical projecting system of claim 8, wherein the optical projecting system is a projector.

\* \* \* \* \*